(12) United States Patent
Hansen

(10) Patent No.: US 6,367,036 B1
(45) Date of Patent: Apr. 2, 2002

(54) FAST TRACE LOG

(75) Inventor: Ole Brian Hansen, Ballerup (DK)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/292,705

(22) Filed: Apr. 15, 1999

(30) Foreign Application Priority Data

Jan. 7, 1999 (GB) ............................................. 9900221

(51) Int. Cl.$^7$ ................................................. G06F 11/00
(52) U.S. Cl. ............................ 714/45; 717/4; 710/310; 711/135
(58) Field of Search ........................ 714/45, 47; 717/1, 717/4; 710/52, 310; 711/135, 147; 709/100, 107, 201, 300

(56) References Cited

U.S. PATENT DOCUMENTS 5,632,032 A   5/1997  Ault et al. ................... 395/670
5,796,939 A * 8/1998  Berc et al.
6,167,473 A * 12/2000  Kho

FOREIGN PATENT DOCUMENTS

EP        0 396 833        11/1990

OTHER PUBLICATIONS

D Hildebrand, "A debugging tool for OS/2 Presentation Manager development", Microsoft Systems Journal, v5, n2, p63(11), Mar. 1990.

* cited by examiner

*Primary Examiner*—Gopal C. Ray
(74) *Attorney, Agent, or Firm*—Lauren C. Bruzzone

(57) ABSTRACT

A fast trace log component for tracing the operation of one or more processes in a multi-processing operating system is described. When instantiated, the component allocates a common buffer within an area of memory and trace information supplied by a process is written to the common buffer. The component includes program codes for obtaining a next address within the buffer at which to write the trace information and for incrementing the next address to an address in the buffer after the trace information; and program codes for flushing the buffer if the trace information would exceed the end of the buffer.

10 Claims, 2 Drawing Sheets

FAST TRACE LOG

FIELD OF THE INVENTION

The present invention relates to a method and component for tracing the operation of one or more programs.

BACKGROUND OF THE INVENTION

A trace or debugging facility is often necessary when developing programs or in programs where, in the event of failure, an audit trail is required. Programmers writing in C or similar languages often use a DEBUG switch to incorporate debugging instructions when they wish to trace the operation of a program during development and to eliminate such debugging instructions in the commercially available program.

Debugging information varies from program to program according to needs and can range from simply writing "I am here" messages to a file, indicating a program arrived at a given point in execution, to dumping the contents of memory before halting a program, so that the state of a computer may be checked at a given point in program execution. In any case, it should be seen that debugging instructions are regarded as a processing overhead and because of this are kept to a minimum or in many cases eliminated completely once program development is complete.

In modern multi-processing environments, programs often execute in parallel with one or more other programs. In such cases, it is possible that the act of removing trace instructions from a program itself may cause the operation of the program to be adversely affected. Also, an individual trace for each separate program may not be useful as it may be difficult to match the sequence of events in one trace with those in another trace. On the other hand, using a single trace for all programs can also prove difficult as it may restrict programs different in nature to outputting the same type of trace information, and also normal program execution in one program may be held up as it tries to write trace information while another program locks the trace file.

It is an object of the present invention to provide a method and component for tracing the simultaneous operation of a plurality processes or threads within a single process which mitigates the above problems.

DISCLOSURE OF THE INVENTION

Accordingly, the invention provides a component instantiable to trace the operation of one or more processes in a multi-processing operating system, said component comprising: means for allocating a common buffer within an area of memory; means for writing trace information supplied by a process to said common buffer; said writing means comprising: means for obtaining a next address within said buffer at which to write said trace information and for incrementing said next address to an address in said buffer after said trace information; and means for flushing said buffer if said trace information would exceed the end of said buffer.

In a further aspect the invention provides a method for tracing the operation of one or more processes in a multi-processing operating system, said method comprising the steps of: allocating a common buffer within an area of memory; writing trace information supplied by a process to said common buffer; said writing step comprising: obtaining a next address within said buffer at which to write said trace information and incrementing said next address to an address in said buffer after said trace information; and flushing said buffer if said trace information would exceed the end of said buffer.

BRIEF DESCRIPTION OF THE DRAWINGS

Embodiments of the invention will now be described with reference to the accompanying drawings, in which.

DESCRIPTION OF THE PREFERRED EMBODIMENTS

The present embodiment will be described in terms of the Windows NT operating system produced by Microsoft Corporation, although it will be seen that the invention is applicable to any multi-processing operating system.

Figure 1:
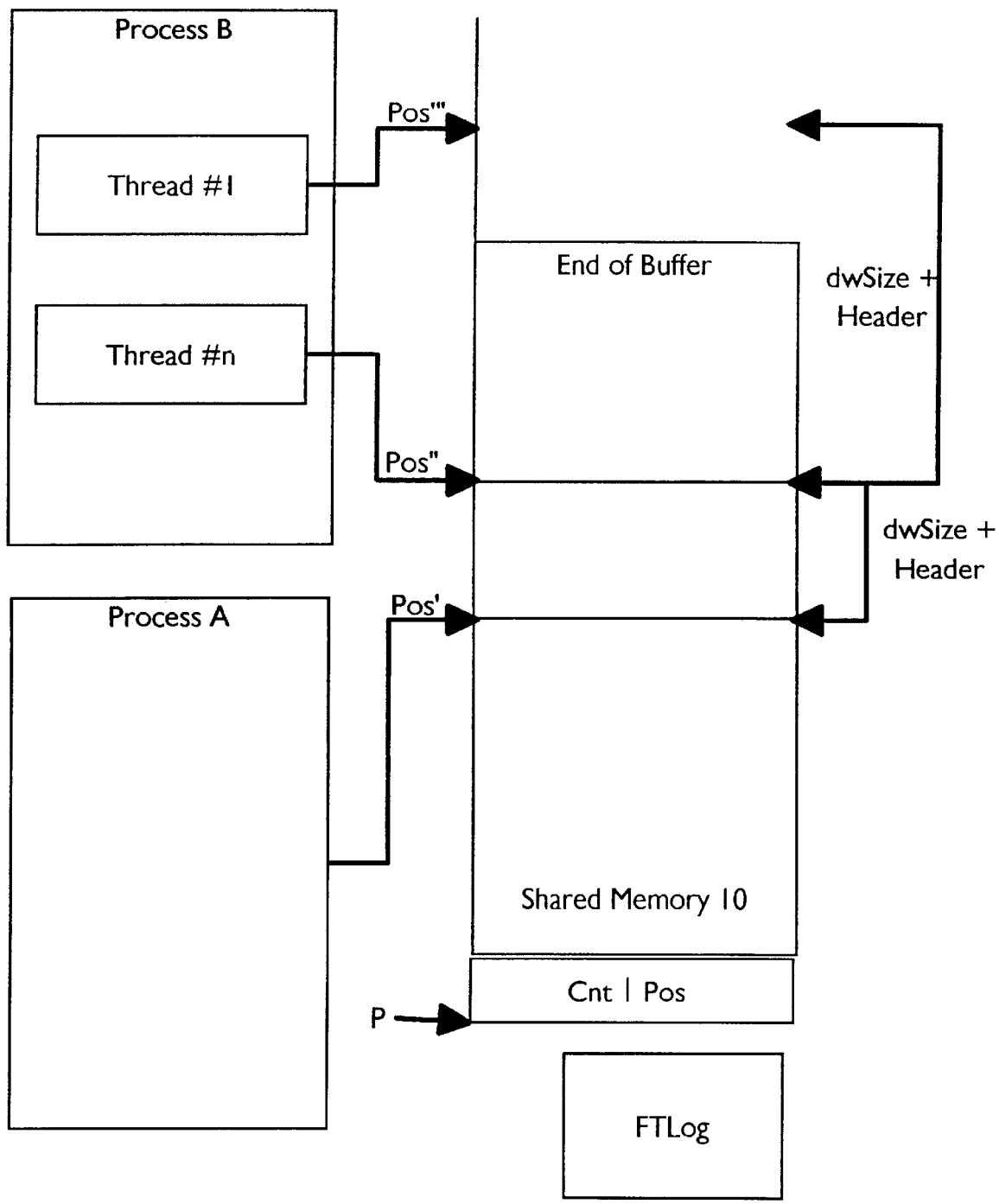
FIG. 1 shows a schematic diagram of a number of processes employing a trace log according to the invention.

Referring now to FIG. 1, the present embodiment comprises a Dynamic Link Library (DLL) called DllExport. A first instantiation of DllExport creates a common memory area (10) where all programs can put a piece of information. This can be done in many ways including allocating a named area of shared memory, using a system call "CreateFileMapping". Further instantiations of DllExport can then check if the named area of memory has been allocated and if so can obtain the start address of the named memory.

DllExport includes a function FTLog which uses a technique that allows very fast storing of the information in this common area together with some standard header information (timestamps, process and thread id, module number, format number, etc.).

The common memory (10) is kept consistent by the use of a single, common variable stored in four bytes at memory location P. The lower three bytes referred to hereafter as, Pos, control the allocation from this memory for every call of the FTLog tracing function, while the upper byte, referred to hereafter as Cnt, contains the number of threads writing to the memory at any given time. Cnt is initialised to 0 when the common area 10 is allocated. When a call to FTLog gets a piece of the common memory, it can write the information to this memory in parallel with other ongoing trace calls to FTLog. Using this single common variable eliminates the need for expensive synchronisation that would otherwise be necessary for consistency between different processes, and eliminates potential contention for a critical section.

The basic FTLog function is of the form: void DllExport FTLog(WORD wModule, WORD wFormat, const void * pvData, DWORD dwSize)

The four arguments being:

wModule: A number identifying the module that calls the trace function. How this number is used is up to the developer(s) that uses the FTLog.

wFormat: A number identifying how the data should be formatted when the trace information is written out (the number identifies a printf-like string, defined elsewhere).

pvData: Pointer to the trace information.

dwSize: The size of the trace information in bytes.

In general, FTLog allocates a requested chunk of shared memory, fills in a standard header and copies the data that pvData is pointing at, before it returns.

Figure 2:
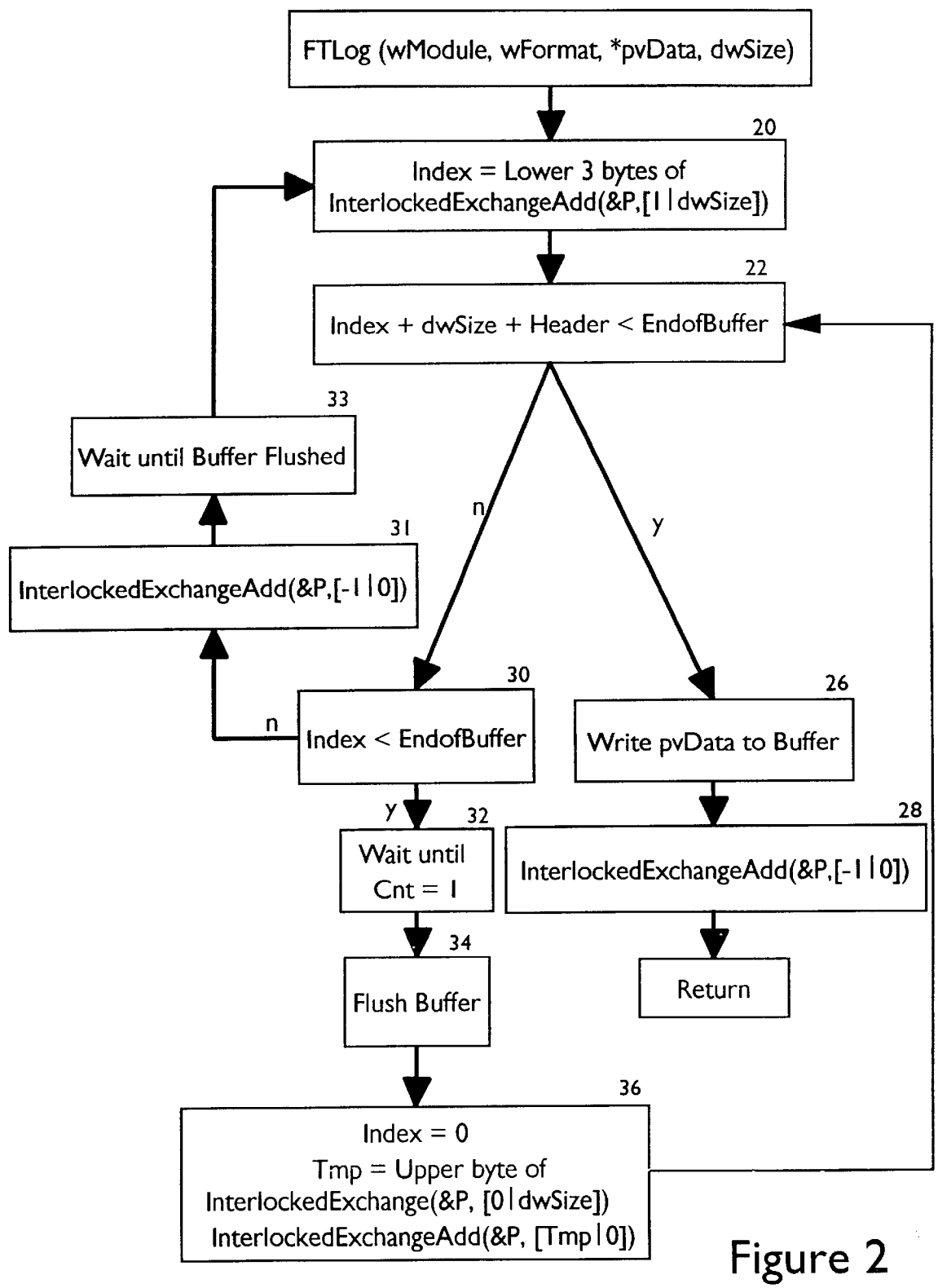
FIG. 2 is a flow diagram of a trace log function according to the invention.

Referring now to FIG. 2, the operation of FTLog is explained in more detail. The function begins at step 20 by calling the function InterlockedExchangeAdd. This function is of the form:

LONG InterlockedExchangeAdd (PLONG Addend, LONG Increment)

It performs an atomic addition of the "increment" value to the "addend" variable. The function prevents more than one thread from using the same variable simultaneously. The return value is the initial value of the Addend parameter.

So at step 20, "1" is added to the upper byte, Cnt, of address P and dwSize is added to the lower three bytes, Pos, and the function returns the original contents of address P. At any time, Cnt contains the number of threads that are currently writing their information to the shared memory. This is so that a 'buffer full action' described below can know when all threads are finished writing their trace information to the shared memory, before FTLog flushes the contents to disk or whatever action is triggered by a full buffer.

Only the lower three bytes of the returned value are assigned to a variable Index, to remove the contamination of the upper byte containing the thread count from Index.

The function then checks at step 22 if Index is valid and if there is sufficient space left in the buffer to write the trace data, by testing if Index plus the size of the trace data and the header information exceeds the address of the end of the common memory area buffer (10). If so, as in the case of Process A in FIG. 1, at step 26 the trace data is written to the buffer, when complete the cnt portion of address P is decremented at step 28 by subtracting 1 from the upper byte of the contents of address P, and the function returns normally.

Index may not be valid for one of two reasons. If, as in the case of thread #1 in process B in FIG. 1, the value of Pos means that Index is beyond the end of the buffer, step 30, the thread #1 FTLog function must wait a short time until the buffer has been flushed and the Pos portion of address P has been reset to the start of the buffer. Thus, at step 31 "1" is subtracted from the cnt portion of address P to indicate that this thread is not writing to the buffer, and at step 33 the thread waits until the buffer has been flushed.

The thread can check if the buffer has been flushed in any number of ways. Assuming that dwSize plus the header do not exceed the size of the buffer, then if Index is further than the length of the buffer from the Pos portion of address P, the thread knows the buffer has been reset.

If more than one buffer is used, then the thread knows the second and subsequent buffers are ready when Index is less than the address of the end of the buffer. The thread knows that the first buffer is ready when Index is further than the number of buffers multiplied by length of the buffers from the Pos portion of address P.

While more than one process or thread may simultaneously arrive step 33 during a progression through a buffer, only one instantiation of FTLog will be in a position where Index is less than the end of the buffer and Index+dwSize+ Header exceeds the end of the buffer. This is also established with the test of step 30. In the example of FIG. 1, this will happen to the instantiation of FTLog in thread #n of Process B. This instantiation must now wait until any threads, for example Process A, that might be writing information into the buffer in parallel are finished. This will be indicated by the variable cnt being equal to "1", step 32. Once this condition is met, the buffer is flushed, step 34. This is typically done by writing the contents of the buffer to a file (not shown). Alternatively, the buffer full action may include printing in an output window.

In any case, so as not to hold up other processes while the buffer is being flushed, it is beneficial to split the common memory area 10 into two or more buffers. The flushing instantiation of FTLog sets up the other of the buffers, by setting the Pos portion of address P to the start of the other buffer, allowing the other instantiations of FTLog to begin writing their information to the other buffer. This allows very fast rollover for one buffer sub-area to the next when the first one is full.

In the present embodiment, Pos is reset at step 36 by InterlockedExchanging the value of dwSize with the Pos portion of address P and using an Index value of zero corresponding to the start of the flushed buffer. Tmp is set to the upper byte of the return value so that the thread count can adjusted having being overwritten by the previous InterlockedExchange.

At this stage any other process including the flushing process can try to obtain a valid Index when they execute step 20 in their instantiation of FTLog.

It will be seen that a call to a FTLog trace function will never (as long as the common area buffer is not full) delay other trace function calls on a single processor machine and will only delay for an extremely short time on a multi-processor machine.

It will be seen that using the invention, a developer (or other person) who wishes to collect trace information, is able to flush this information continually to a disk file for later examination. If a program stops with a fatal error then the tracing information that the program and all other programs have generated up to the error are still in the memory area 10. This information can be explicitly flushed to a disk for later examination, by providing for example a FTFlush function within DllExport. Thus, if a program discovers an error while it is running, it is possible for the program to flush the tracing information that all programs have generated up to the error to the disk for later examination by the developer.

Alternatively, FTLog could also be adapted to do the detection of a fatal stop, so that it flushes the trace information to the disk.

The time period of trace information that FTLog can hold depends on the size of the common memory area that is used for storing the information. It will be seen that one of the main advantages of the invention is that all programs are recorded together and can be viewed together to find inter-process communication bugs.

It will also be seen that when viewing a FTLog file it will be possible to get a filtered view of the log, so that a developer only sees information that interest him/her.

The fast collection of information is also helped by not doing any formatting of the trace information before somebody wishes to look at it and so trace functions are so fast that they can always be on in case of an unexpected error.

It will be seen that the invention avoids the use of mutexes, which would be required rather than critical sections due to sharing between processes, by having only a single variable controlling allocation within a given buffer. It will also be seen that passing erroneous data to the trace functions can be handled gracefully by catching exceptions and not holding a critical section or mutex while working on trace data.

What is claimed is:

1. A component instantiable to trace the operation of one or more processes in a multi-processing operating system, said component comprising:

means for allocating a common buffer within an area of memory;

means for writing trace information supplied by a process to said common buffer; said writing means comprising:

means for obtaining a next address within said buffer at which to write said trace information and for incrementing said next address to an address in said buffer after said trace information; and means for flushing said buffer if said trace information would exceed the end of said buffer.

2. A component as claimed in claim 1 wherein said writing means comprises:

means, responsive to said next address exceeding the end of the buffer, for waiting until said buffer is flushed before obtaining another next address.

3. A component as claimed in claim 1 wherein said writing means comprises:

means for indicating that said writing means is writing trace information to said buffer; and said flushing means is adapted to wait until any other instantiations of said component have completed writing trace information to said buffer before flushing said buffer.

4. A component as claimed in claim 3 wherein said indicating means and said next address incrementing means operate on a single common variable indicative of the number of processes simultaneously writing to said buffer and of said next address in said buffer.

5. A component as claimed in claim 1 wherein said memory includes two buffers and, before flushing any one of said buffers, said flushing means is adapted to increment said next address to the start of the other of said buffers.

6. A component as claimed in claim 1 wherein said trace information comprises a header including a timestamp and a process identifier.

7. A component as claimed in claim 1 wherein said multi-processing operating system is the Windows NT operating system and wherein said address obtaining and incrementing means is the InterlockedExchangeAdd function.

8. A component as claimed in claim 1 wherein said memory is common to more than one process.

9. A computer program product comprising computer program code stored on a computer readable storage medium for, when executed on a computer, tracing the operation of one or more processes in a multi-processing operating system, the program code comprising a component as claimed in claim 1.

10. A method for tracing the operation of one or more processes in a multi-processing operating system, said method comprising the steps of:

allocating a common buffer within an area of memory;

writing trace information supplied by a process to said common buffer; said writing step comprising:

obtaining a next address within said buffer at which to write said trace information and incrementing said next address to an address in said buffer after said trace information; and flushing said buffer if said trace information would exceed the end of said buffer.

* * * * *